United States Patent
Xia (10) Patent No.: US 10,530,533 B2
(45) Date of Patent: Jan. 7, 2020

(54) METHOD FOR REALIZING SENDING OF HYBRID AUTOMATIC REPEAT REQUEST INFORMATION, AND DATA RECEIVING END

(71) Applicant: ZTE CORPORATION, Shenzhen (CN)

(72) Inventor: Shuqiang Xia, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 186 days.

(21) Appl. No.: 15/547,593

(22) PCT Filed: Feb. 1, 2016

(86) PCT No.: PCT/CN2016/073098
§ 371 (c)(1),
(2) Date: Jul. 31, 2017

(87) PCT Pub. No.: WO2016/119759
PCT Pub. Date: Aug. 4, 2016

(65) Prior Publication Data
US 2018/0026754 A1    Jan. 25, 2018

(30) Foreign Application Priority Data

Jan. 30, 2015 (CN) .......................... 2015 1 0050725

(51) Int. Cl.
*H04L 1/18* (2006.01)
*H04L 5/00* (2006.01)
(Continued)

(52) U.S. Cl.
CPC .......... *H04L 1/1812* (2013.01); *H04L 1/1861* (2013.01); *H04L 5/0055* (2013.01); *H04L 5/14* (2013.01); *H04L 5/1469* (2013.01); *H04W 84/042* (2013.01)

(58) Field of Classification Search
None
See application file for complete search history.

(56) References Cited

U.S. PATENT DOCUMENTS 8,879,487 B2    11/2014  Hariharan et al.
2009/0129317 A1*  5/2009  Che ...................... H04L 1/1614
                                                                      370/328
(Continued)

FOREIGN PATENT DOCUMENTS

CN    101631007    1/2010
CN    102082643    6/2011
(Continued)

OTHER PUBLICATIONS

International Search Report for PCT/CN2016/073098, English Translation attached to original, Both completed by the Chinese Patent Office on Apr. 19, 2016 All together 5 Pages.
(Continued)

*Primary Examiner* — George C Atkins
(74) *Attorney, Agent, or Firm* — McDonald Hopkins LLC (57) ABSTRACT

A method is described for sending of Hybrid Automatic Repeat reQuest (HARQ) information, and a data receiving end. The method includes: a data receiving end sends HARQ information determined through detection results for received transport blocks to a data sending end according to the number of scheduling resources and the feedback number of expected maximum feedback Acknowledgements (ACK). The number of bits of HARQ is determined by the number of scheduling resources and the feedback number, and HARQ information is determined according to the detection results for the received transport blocks, and feedback is conducted on the determined number of bits of the HARQ.

20 Claims, 1 Drawing Sheet

(51) Int. Cl.
*H04L 5/14* (2006.01)
*H04W 84/04* (2009.01)

(56) References Cited

U.S. PATENT DOCUMENTS

| | | | | |
|---|---|---|---|---|
| 2012/0218923 | A1* | 8/2012 | Lim | H04L 1/1861 |
| | | | | 370/281 |
| 2015/0003302 | A1* | 1/2015 | Ekpenyong | H04W 72/14 |
| | | | | 370/280 |
| 2017/0257849 | A1* | 9/2017 | Oketani | H04W 28/04 |
| 2017/0302412 | A1* | 10/2017 | Guan | H04L 1/18 |

FOREIGN PATENT DOCUMENTS

| | | |
|---|---|---|
| CN | 102598572 | 7/2012 |
| CN | 103095437 | 5/2013 |
| CN | 103095473 A * | 5/2013 |

OTHER PUBLICATIONS

Extended European Search Report dated Nov. 29, 2017 for European Patent Application No. 16742821.8.
LG Electronics: "ACK/NACK piggyback on PUSH in TDD", 3GPP Draft; R1-111619 TDD an on PUSCH, 3rd Generation Partnership Project, Mobile Competence Centre; 650, Route Des Lucioles; F-06921 Sophia-Antipolis Cedex; France, vol. RAN WG1, No. Barcelona, Spain ; May 9, 2011, May 3, 2011, XP050491262, retrieved on May 3, 2011.
Li Zhang et al.: "HARQ Feedback for Carrier Aggregation in LTE-A TDD", ICC 2011—2011 IEEE International Conference on Communications—Jun. 5-9, 2011, Kyoto, Japan, IEEE, Piscataway, NJ, USA, Jun. 5, 2011, pp. 1-6, XP031908816, DOI: 10.1109/ICC. 2011.5963064; ISBN: 978-1-61284-232-5.

* cited by examiner

METHOD FOR REALIZING SENDING OF HYBRID AUTOMATIC REPEAT REQUEST INFORMATION, AND DATA RECEIVING END

CROSS-REFERENCE TO RELATED APPLICATION(S)

This application is the U.S. national phase of PCT Application No. PCT/CN2016/073098 filed Feb. 1, 2016, which claims priority to Chinese Application No. 201510050725.6 filed Jan. 30, 2015, the disclosures of which are incorporated in their entirety by reference herein.

TECHNICAL FIELD

The present application relates to, but not limited to, the field of communications, and more particularly to a method for sending of Hybrid Automatic Repeat reQuest (HARQ) information, and a data receiving end.

BACKGROUND

To improve the peak rate and user experience of a user, a network side (data sending end) usually sends data to a terminal (data receiving end) without limiting on a carrier/process.

Accordingly, the data receiving end needs to send HARQ information to the data sending end, namely feeds a result indicating whether data on each carrier/process is correct back. If detection is correct, an Acknowledgement (ACK) will be fed back. Otherwise, a Negative Acknowledgement (NACK) will be fed back.

In an existing $3^{rd}$ Generation Partnership Project (3GPP) Long Term Evolution (LTE) system, the terminal needs to feed HARQ information back according to the number of carriers configured and a transmission mode of each carrier by the network side. If the transmission mode of the carriers is a spatial multiplexing mode, each carrier needs to feed 2-bit HARQ information back. Otherwise, each carrier needs to feed 1-bit HARQ information back. For example, the network side configures five carriers for the terminal, and a transmission mode of each carrier is a spatial multiplexing mode, then, the terminal needs to feed 10-bit HARQ information back to a network on an uplink sub-frame. If the carriers are Time Division Duplexing (TDD) carriers, the terminal also needs to configure HARQ information according to uplink and downlink configurations of the carriers. Suppose that the network configures a TDD carrier for the terminal and an uplink and downlink configuration of the carrier is a configuration 5, the terminal needs to feed HARQ information (9 bits) of nine downlink sub-frames back on an uplink sub-frame. Likewise, if the network configures two TDD carriers for the terminal, and uplink and downlink configurations of the carriers are configurations 5, the terminal needs to feed HARQ information (18 bits) of 18 downlink sub-frames back on an uplink sub-frame. The number of carriers and the number of downlink sub-frames in the above-mentioned examples are a resource range of data probably sent to the terminal by the network side. Actually, due to the reasons of network loads, carrier availability and the like, at most situations the network side may send data to the terminal over some resources within the resource range. When the resource range configured by the network side is very large and there are few available resources that are used in the actual sending, the terminal still feeds the HARQ information back according to resources configured by the network side, then the following problems will be caused: many bits that are fed back are unavailable, thus not only increasing the overhead, but also reducing the performance of available bits; if the power is increased to ensure the performance of the available bits, the intra-system interference is also increased equivalently. A method for solving the above-mentioned problem is that: the terminal conducts HARQ feedback according to detected actual situations, but this also causes another problem: since the reliability of a physical layer control signaling indicating data transmission is much lower than the reliability of high-layer configuration information, this feedback mode may cause that the network cannot correctly understand the HARQ information fed back by the terminal. For example, the network sends data to the terminal over a resource 0, a resource 1 and a resource 2. However, due to the reasons such as a channel, the terminal does not correctly receive the physical layer control signaling indicating data transmission over the resource 0 and the resource 1. In this case, the terminal only feeds HARQ information corresponding to the resource 2 back to the network. After receiving the information, the network side does not know which resource the HARQ information belongs to.

Any effective solution has not been proposed yet at present for the above-mentioned problem.

SUMMARY

The following is a summary for a subject described herein in detail. The summary is not intended to restrict the scope of protection of claims.

The embodiment of the present disclosure provides a method and device for sending of HARQ information, capable of making a network side clearly know for which resource HARQ information is fed back whilst conducting HARQ feedback according to detected actual situations.

The embodiment of the present disclosure provides a method for sending of HARQ information. The method includes that:

a data receiving end sends HARQ information to a data sending end according to the number of scheduling resources and the feedback number of expected maximum feedback ACKs, and the HARQ information is determined through detection results for received transport blocks.

In an exemplary embodiment, that a data receiving end sends HARQ information to a data sending end according to the number of scheduling resources and the feedback number of expected maximum feedback ACKs and the HARQ information is determined through detection results for received transport blocks includes:

the data receiving end determines a number of bits of HARQ according to the number of scheduling resources and the feedback number of expected maximum feedback ACKs; and the data receiving end determines HARQ information according to the detection results for the received transport blocks, and sends the HARQ information to the data sending end by using the determined number of bits of HARQ;

herein the feedback number is M, and the number of scheduling resources is N; and the N is a positive integer greater than or equal to 3, and the M is a positive integer less than the N.

In an exemplary embodiment, the M is a value pre-determined by the data receiving end and the data sending end.

In an exemplary embodiment, the M is:
a maximum value greater than or equal to the number of scheduling resources used for receiving the transport blocks by the data receiving end, or,
a maximum value greater than or equal to the number of scheduling resources used for sending the transport blocks by the data sending end.

In an exemplary embodiment, $$M < \left\lfloor \frac{N-1}{2} \right\rfloor;$$

herein $\lfloor \; \rfloor$ represents round-down.

In an exemplary embodiment, the number of bits of HARQ is K, $K = \lceil \log_2(\Sigma_{i=0}^{M} C_N^i) \rceil$, herein $\lceil \; \rceil$ represents round-up.

In an exemplary embodiment, the feedback number of expected maximum feedback ACKs is sent to the data receiving end in a signaling mode.

In an exemplary embodiment, the method further includes: the data receiving end determines the number of scheduling resources and/or the feedback number of expected maximum feedback ACKs according to resource configuration information.

In an exemplary embodiment, that the data receiving end determines HARQ information according to the detection results for the received transport blocks includes:
the data receiving end detects the received transport blocks, and takes scheduling resource index information corresponding to detection results indicating ACKs or NACKs as the determined HARQ information.

In an exemplary embodiment, when the detection results are that the number of ACKs is Q and a scheduling resource index corresponding to an $i^{th}$ ACK or NACK is $S_i$, the method further includes:
mapping scheduling resource indexes corresponding to different detection results indicating ACKs or NACKs to an integer r, and sending r, served as the determined HARQ information, to the data sending end;
when $0 \leq Q \leq M$, is:

$$\left( \sum_{i=0}^{Q-1} (C_N^i + C_{N-S_i}^{Q-i}) + \left\lfloor \frac{Q}{M} \right\rfloor + C \right) \bmod(2^K - 1),$$

or $$\left( \sum_{i=0}^{Q-1} (C_N^i + C_{N-S_i}^{Q-i}) + \left\lfloor \frac{Q}{N} \right\rfloor + C \right) \bmod(2^K - 1);$$

herein N scheduling resource indexes are 1, 2, . . . , N, and $S_i$ is a positive integer mutually different in a monotonic function, and
$i \in [0, 1, K\, Q-1]$, and C is an integer constant.

In an exemplary embodiment, the method further includes:
when Q>M, the data receiving end randomly selects M scheduling resource indexes from $\{S_0, S_1 \ldots S_{Q-1}\}$, herein the M randomly-selected scheduling resource indexes are: $D_0, D_1 \ldots D_{M-1}$, and $D_i$ is a positive integer mutually different in a monotonic function; and
the data receiving end maps the M scheduling resource indexes to an integer r, and sends the integer r, served as the determined HARQ information, to the data sending end,
herein r is: $(\Sigma_{i=0}^{M-1}(C_N^i + C_{N-D_i}^{M-i}) + C) \bmod(2^K - 1)$.

In an exemplary embodiment, that the data receiving end randomly selects M scheduling resource indexes from $\{S_0, S_1 \ldots S_{Q-1}\}$ includes:
the data receiving end selects M scheduling resource indexes from $\{S_0, S_1 \ldots S_{Q-1}\}$ according to a scheduling resource index selection range pre-determined by the data sending end and the data receiving end.

In an exemplary embodiment, that the data receiving end randomly selects M scheduling resource indexes from $\{S_0, S_1 \ldots S_{Q-1}\}$ includes:
the data receiving end selects M minimum or maximum scheduling resource indexes from $\{S_0, S_1 \ldots S_{Q-1}\}$ according to a scheduling resource index selection range pre-determined by the data sending end and the data receiving end.

In an exemplary embodiment, when $Q \leq M$ and M is greater than or equal to 2,
the method further includes:
the data receiving end determines that the number of bits of HARQ information to be fed back is K according to N and M, herein $K \geq \lceil \log_2(N-M+2) \rceil + M - 1$.

In an exemplary embodiment, after it is determined that the number of bits of HARQ information to be fed back is K, the method further includes:
mapping scheduling resource indexes corresponding to different detection results indicating ACKs or NACKs to an integer r, and sending r, served as the determined HARQ information, to the data sending end,
r is: $(R+C_1) \bmod(2^{K-1})$;
herein $$R = 2^{M-1} \ast (u - 1) + \left( \sum_{i=g(u)}^{Q-1} 2^{V_i} \right) + g(u) - 1 + \left\lceil \frac{Q}{M} \right\rceil;$$

$u = \min(s_0, N-M+2)$;

$$g(u) = \begin{cases} 1, u \leq N - M + 1 \\ 0, u > N - M + 1 \end{cases};$$

$v_i = (s_i - u - g(u) + C_2) \bmod(M-1)$; and
$C_1$ and $C_2$ are integer constants.

In an exemplary embodiment, the method further includes:
representing the integer r by using K binary bits respectively, and sending the integer r to the data sending end.

In an exemplary embodiment, before the r is sent to the data sending end, the method further includes:
coding and/or modulating and/or interleaving the r.

In another aspect, the embodiment of the present disclosure also provides a data receiving end for sending of HARQ information, which includes: a determination unit and a feedback sending unit.

The determination unit is configured to determine the number of bits of HARQ according to the number of scheduling resources and the feedback number of expected maximum feedback ACKs.

The feedback sending unit is configured to determine HARQ information according to detection results for received transport blocks, and send the HARQ information to a data sending end by using the determined number of bits of HARQ.

The feedback number is M, and the number of scheduling resources is N, and the N is a positive integer greater than or equal to 3, and the M is a positive integer less than the N.

In an exemplary embodiment, the data receiving end further includes a receiving unit configured to receive the feedback number of expected maximum feedback ACKs sent in a signaling mode.

In an exemplary embodiment, the feedback sending unit is configured to, detect the received transport blocks, and take scheduling resource index information corresponding to detection results indicating ACKs or NACKs as the determined HARQ information; and send the HARQ information to the data sending end on the determined number of bits of HARQ to be fed back.

In an exemplary embodiment, the data receiving end further includes an information determination unit, configured to determine the number of scheduling resources and/or the feedback number of expected maximum feedback ACKs according to resource configuration information.

In an exemplary embodiment, the data receiving end further includes an index mapping unit, configured to: when the detection results are that the number of ACKs is Q and a scheduling resource index corresponding to an $i^{th}$ ACK is $S_i$, map scheduling resource indexes corresponding to different detection results indicating ACKs or an NACKs to an integer r, and send r, served as the determined HARQ information, to the data sending end, such that the data sending end performs a query according to the value of r to obtain scheduling resource indexes corresponding to ACKs of the detection results; and map scheduling resource indexes corresponding to ACKs of different detection results to a mutually-different integer r, and send r, served as the determined HARQ information, to the data sending end, when $0 \leq Q \leq M$ is:

$$\left(\sum_{i=0}^{Q-1}(C_N^i + C_{N-S_i}^{Q-i}) + \left\lfloor \frac{Q}{M} \right\rfloor + C\right) \bmod(2^K - 1),$$

or $$\left(\sum_{i=0}^{Q-1}(C_N^i + C_{N-S_i}^{Q-i}) + \left\lfloor \frac{Q}{N} \right\rfloor + C\right) \bmod(2^K - 1);$$

herein N scheduling resource indexes are 1, 2, . . . , N, and $S_i$ is a positive integer mutually different in a monotonic function, and $i \in [0, 1, K\ Q-1]$, and C is an integer constant.

In an exemplary embodiment, the index mapping unit is further configured to, when Q>M, randomly select M scheduling resource indexes from $\{S_0, S_1 \ldots S_{Q-1}\}$, herein the M randomly-selected scheduling resource indexes are: $D_0, D_1 \ldots D_{M-1}$, and $D_i$ is a positive integer mutually different in a monotonic function; and map the M scheduling resource indexes to a mutually-different integer r, and send the integer r, served as the determined HARQ information, to the data sending end, herein the r is: $(\Sigma_{i=0}^{M-1}(C_N^i + C_{N-D_i}^{M-i}) + C) \bmod(2^K - 1)$.

In an exemplary embodiment, the index mapping unit is further configured to, when Q>M, randomly select M scheduling resource indexes from $\{S_0, S_1 \ldots S_{Q-1}\}$ according to a scheduling resource index selection range pre-determined by the data sending end and the data receiving end.

In an exemplary embodiment, the index mapping unit is further configured to, when Q>M, randomly select M maximum or minimum scheduling resource indexes from $\{S_0, S_1 \ldots S_{Q-1}\}$ according to a scheduling resource index selection range pre-determined by the data sending end and the data receiving end.

In an exemplary embodiment, the data receiving end further includes an index mapping unit, configured to, after determining that the number of bits of HARQ information to be fed back is K, map scheduling resource indexes corresponding to different detection results indicating ACKs or NACKs to an integer r, and send the r, served as the determined HARQ information, to the data sending end, such that the data sending end performs an query according to a value of r to obtain scheduling resource index corresponding to ACKs of the detection results;

the r is: $(R+C_1) \bmod(2^{K-1})$ herein $$R = 2^{M-1} * (u-1) + \left(\sum_{i=g(u)}^{Q-1} 2^{V_i}\right) + g(u) - 1 + \left\lceil \frac{Q}{M} \right\rceil;$$

$u = \min(s_0, N-M+2);$ $$g(u) = \begin{cases} 1, u \leq N - M + 1 \\ 0, u > N - M + 1 \end{cases};$$

and $v_i = (s_i - u - g(u) + C_2) \bmod(M-1)$; and $C_1$ and $C_2$ are integer constants.

Compared with the conventional art, the technical solution provided in the present disclosure includes: a data receiving end sends HARQ information determined through detection results for received transport blocks to a data sending end according to the number of scheduling resources and the feedback number of expected maximum feedback ACKs. By means of the present disclosure, the bit number of an HARQ is determined by the number of scheduling resources and the feedback number, and HARQ information is determined according to the detection results for the received transport blocks, and feedback is conducted on the determined bit number of the HARQ, so that a data sending end determines the HARQ information is a content sent for which HARQ information. On the other hand, the overhead of the HARQ information is saved by mapping of the scheduling resource indexes.

After the drawings and the detailed descriptions are read and understood, other aspects may be understood.

DETAILED DESCRIPTION

The embodiments of the present disclosure will be illustrated hereinbelow with the drawings in detail. It is important to note that embodiments in the present application and characteristics in the embodiments may be arbitrarily combined with each other under the condition of no conflicts.

Figure 1:
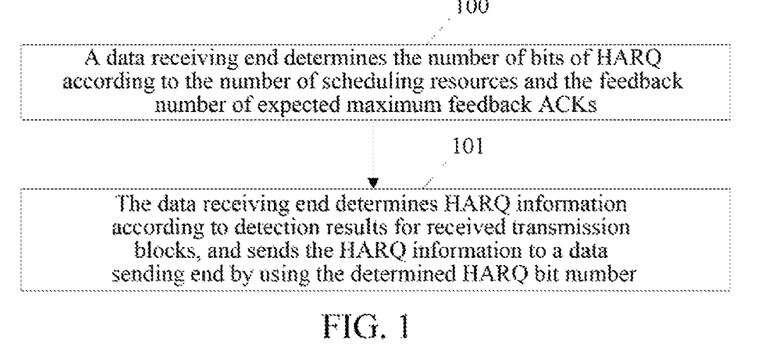
FIG. 1 is a flowchart of a method for sending of HARQ information according to an embodiment of the present disclosure.

FIG. 1 is a flowchart of a method for sending of HARQ information according to an embodiment of the present disclosure. As shown in FIG. 1, the method includes that:

a data receiving end sends HARQ information determined through detection results for received transport blocks to a data sending end according to the number of scheduling resources and the feedback number of expected maximum feedback ACKs.

The method further includes the steps 100-101 as follows.

In step 100, the data receiving end determines the number of bits of HARQ according to the number of scheduling resources and the feedback number of expected maximum feedback ACKs.

Here, the feedback number is M, and the number of scheduling resources is N, and the N is a positive integer greater than or equal to 3, and the M is a positive integer less than N.

In an exemplary embodiment, in the present step, the M is a value pre-determined by the data receiving end and the data sending end.

In an exemplary embodiment, the M is:

a maximum value greater than or equal to the number of scheduling resources used for receiving the transport blocks by the data receiving end, or, a maximum value greater than or equal to the number of scheduling resources used for sending the transport blocks by the data sending end.

In an exemplary embodiment, $$M < \left\lfloor \frac{N-1}{2} \right\rfloor,$$

herein $\lfloor \ \rfloor$ represents round-down.

In an exemplary embodiment, in the present step, the feedback number of expected maximum feedback ACKs is sent to the data receiving end in a signaling mode.

In the embodiment of the present disclosure, before the present step, the method further includes: the data receiving end determines the number of scheduling resources and/or the feedback number of expected maximum feedback ACKs according to resource configuration information.

It is important to note that in practical application, the number of scheduling resources is sent to the data receiving end in a signaling mode. The number of scheduling resources is determined according to resource configuration information pre-determined by the data receiving end and the data sending end. The content of the resource configuration information is determined according to a data sending mode of the data sending end.

Specifically, when the data receiving end determines that the data sending end sends data on a Frequency Division Duplexing (FDD) carrier, resource configuration information includes: carriers for sending data, and/or a transmission mode of each carrier, and/or an HARQ feedback mode of each carrier; and when the data receiving end determines that the data sending end sends data on a TDD carrier, resource configuration information includes: carriers for sending data, and/or a transmission mode of each carrier, and/or an HARQ feedback mode of each carrier, and uplink and downlink configuration information of TDD. Herein, the HARQ feedback mode includes: a one-to-one mode where one of the transport blocks of a carrier corresponds to one HARQ bit, and a many-to-one mode where the multiple transport blocks of a carrier correspond to one HARQ bit.

When carrier indexes of the carriers for sending data are 0, 1, 2, . . . , (L−1); and the number of transport blocks of the $w^{th}$ carrier is $P_w$, every $X_w$ transport blocks correspond to one HARQ bit, and the determined number of scheduling resources is $$\sum_{w=0}^{L-1} \frac{P_w}{X_w},$$

herein $w \in [0, 1, 2 \ldots (L-1)]$. For example, when the FDD carrier operates on a spatial multiplexing carrier, $P_w$ is 2; when the FDD carrier operates on a non-spatial multiplexing carrier, $P_w$ is 1; and when the carrier is a TDD carrier, $P_w$ is determined according to the uplink and downlink configuration information and a carrier operating mode. The following example is given for the uplink and downlink configuration information. Determining $P_w$ according to the uplink and downlink configuration information and a carrier working mode, for example, includes: according to a scenario where an uplink configuration of the carrier is configuration 2 and one uplink sub-frame needs to feed data of four downlink sub-frames back, when the carrier working mode is the spatial multiplexing mode, $P_w$ is determined to be 8; and when the carrier working mode is the non-spatial multiplexing mode, $P_w$ is determined to be 4.

In step 101, the data receiving end determines HARQ information according to detection results for received transport blocks, and sends the HARQ information to the data sending end by using the determined number of bits of HARQ.

In an exemplary embodiment, in the present step, the number of bits of HARQ is K, and $K = \lceil \log_2(\Sigma_{i=0}^{M}(C_N^{\ i})) \rceil$, herein $\lceil \ \rceil$ represents round-up.

That the data receiving end determines HARQ information according to detection results for received transport blocks includes:

the data receiving end detects the received transport blocks, and takes scheduling resource index information corresponding to detection results indicating ACKs or NACKs as the determined HARQ information.

When the detection results are that the number of ACKs is Q and a scheduling resource index corresponding to the $i^{th}$ ACK or NACK is $S_i$, the method in the present disclosure further includes:

scheduling resource indexes corresponding to different detection results indicating ACKs or NACKs are mapped to an integer r, and the r, served as the determined HARQ information, is sent to the data sending end;

when $$0 \leq Q \leq M, r \text{ is:} \left( \sum_{i=0}^{Q-1} (C_N^i + C_{N-S_i}^{Q-i}) + \left\lfloor \frac{Q}{M} \right\rfloor + C \right) \bmod(2^K - 1);$$

or, $$\left( \sum_{i=0}^{Q-1} (C_N^i + C_{N-S_i}^{Q-i}) + \left\lfloor \frac{Q}{N} \right\rfloor + C \right) \bmod(2^K - 1);$$

herein N scheduling resource indexes are 1, 2, ..., N, and $S_i$ is a positive integer mutually different in a monotonic function, and $i \in [0, 1, \text{K } Q-1]$, and C is an integer constant.

It is important to note that since the scheduling resource indexes for ACKs or NACKs are mapped, when a data block does not receive scheduling resource index information, namely, it is indicated that detection results for part of transport blocks are the NACKs, the transport blocks for the NACKs are processed.

The method in the embodiment of the present disclosure further includes that:

when Q>M, the data receiving end randomly selects M scheduling resource indexes from $\{S_0, S_1 \ldots S_{Q-1}\}$, herein the M randomly-selected scheduling resource indexes are $D_0, D_1 \ldots D_{M-1}$, and $D_i$ is a positive integer mutually different in a monotonic function.

In an exemplary embodiment, that the data receiving end randomly selects M scheduling resource indexes from $\{S_0, S_1 \ldots S_{Q-1}\}$ includes: the data receiving end selects M scheduling resource indexes from $\{S_0, S_1 \ldots S_{Q-1}\}$ according to a scheduling resource index selection range pre-determined by the data sending end and the data receiving end.

In an exemplary embodiment, M minimum or maximum scheduling resource indexes are selected.

The data receiving end maps the M scheduling resource indexes to an integer r, and sends the integer r, served as the determined HARQ information, to the data sending end.

Herein r is: $(\Sigma_{i=0}^{M-1}(C_N^i + C_{N-D_i}^{M-i}) + C) \mod (2^K - 1)$.

In an exemplary embodiment, when Q≤M and M is greater than or equal to 2, the method in the embodiment of the present disclosure further includes:

the data receiving end determines that a feedback number of bits of HARQ information is K according to N and M, herein $K \geq \lceil \log_2(N-M+2) \rceil + M - 1$.

After it is determined that the feedback number of bits of HARQ information is K, the method in the embodiment of the present disclosure further includes:

scheduling resource indexes corresponding to different detection results indicating ACKs or NACKs are mapped to an integer r, and r, served as the determined HARQ information, is sent to the data sending end;

herein r is: $(R+C_1) \mod (2^{K-1})$;
herein $$R = 2^{M-1} * (u-1) + \left(\sum_{i=g(u)}^{Q-1} 2^{V_i}\right) + g(u) - 1 + \left\lceil \frac{Q}{M} \right\rceil;$$

$u = \min(s_0, N-M+2)$;

$$g(u) = \begin{cases} 1, & u \leq N-M+1 \\ 0, & u > N-M+1 \end{cases};$$

and
$v_i = (s_i - u - g(u) + C_2) \mod (M-1)$; and
$C_1$ and $C_2$ are integer constants.

In an exemplary embodiment, the method in the embodiment of the present disclosure further includes:

the integer r to which scheduling resource indexes of different detection results indicating ACKs map are represented by using K binary bits respectively, and the integer r to the data sending end.

In an exemplary embodiment, before the r is sent to the data sending end, the method in the embodiment of the present disclosure further includes:

coding and/or modulating and/or interleaving the r.

It is important to note that coding and/or modulating and/or interleaving r or the like are conventional processing for information in a communication process. In a practical application, other corresponding processing may be conducted on r according to actual situations.

By means of the present disclosure, the number of bits of HARQ is determined by pre-determined resource configuration information and feedback number, and HARQ information is determined according to detection results for received transport blocks, and feedback is conducted by the determined bit number of the HARQ, so that a data sending end can determine that the HARQ information is the content sent for which HARQ information. On the other hand, the overhead of the HARQ information is saved by mapping of scheduling resource indexes.

Figure 2:
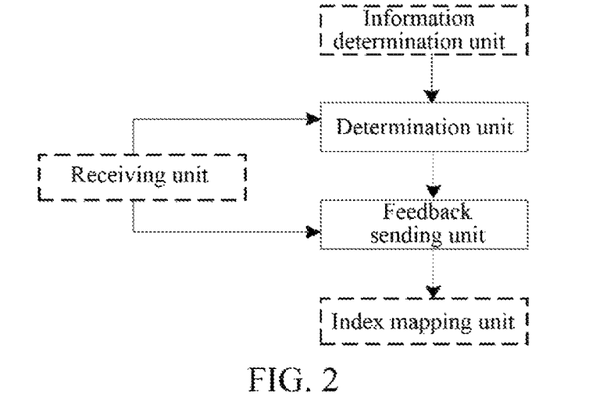
FIG. 2 is a block diagram of a data receiving end for sending of HARQ information according to an embodiment of the present disclosure.

FIG. 2 is a structural block diagram of a data receiving end for sending of HARQ information according to an embodiment of the present disclosure. As shown in FIG. 2, the data receiving end includes: a determination unit and a feedback sending unit.

The determination unit is configured to, determine the number of bits of HARQ according to the number of scheduling resources and the feedback number of expected maximum feedback ACKs.

The feedback sending unit is configured to, determine HARQ information according to detection results for received transport blocks, and send the HARQ information to a data sending end by using the determined number of bits of HARQ.

The feedback number is M, and the number of scheduling resources is N, herein the N is a positive integer greater than or equal to 3, and the M is a positive integer less than the N.

The data receiving end further includes a receiving unit, configured to receive the feedback number of expected maximum feedback ACKs sent in a signaling mode.

The data receiving end in the present disclosure further includes an information determination unit, configured to determine the number of scheduling resources and/or the feedback number of expected maximum feedback ACKs according to resource configuration information.

The feedback sending unit is configured to, detect the received transport blocks, and take scheduling resource index information corresponding to detection results indicating ACKs or NACKs as the determined HARQ information; and send the HARQ information to the data sending end by the determined feedback number of bits of HARQ.

The data receiving end further includes an index mapping unit, configured to, when the detection results are that the number of ACKs is Q and a scheduling resource index corresponding to the $i^{th}$ ACK or NACK is $S_i$, map scheduling resource indexes corresponding to different detection results indicating ACKs or NACKs to an integer r, and send r, served as the determined HARQ information, to the data sending end, such that the data sending end performs a query according to the value of the r to obtain scheduling resource indexes corresponding to detection results indicating ACKs; and map scheduling resource indexes corresponding to different detection results indicating ACKs or NACKs to a mutually-different integer r, and send r, served as the determined HARQ information, to the data sending end, herein when $0 \leq Q \leq M$, the r is:

$$\left(\sum_{i=0}^{Q-1}(C_N^i + C_{N-S_i}^{Q-i}) + \left\lfloor \frac{Q}{M} \right\rfloor + C\right) \bmod(2^K - 1),$$

or $$\left(\sum_{i=0}^{Q-1}(C_N^i + C_{N-S_i}^{Q-i}) + \left\lfloor \frac{Q}{N} \right\rfloor + C\right) \bmod(2^K - 1);$$

herein N scheduling resource indexes are 1, 2, ..., N, and $S_i$ is a positive integer mutually different in a monotonic function, and $i \in [0, 1, K\ Q-1]$, and C is an integer constant.

The index mapping unit is further configured to, when Q>M, randomly select M scheduling resource indexes from $\{S_0, S_1 \ldots S_{Q-1}\}$ herein the M randomly-selected scheduling resource indexes are: $D_0, D_1 \ldots D_{M-1}$, and $D_i$ is a positive integer mutually different in a monotonic function; and map the M scheduling resource indexes to a mutually-different integer r, and send the integer r, served as the determined HARQ information, to the data sending end, herein the r is: $(\Sigma_{i=0}^{M-1}(C_N^i + C_{N-D_i}^{M-i}) + C) \bmod(2^K-1)$.

The index mapping unit is further configured to, when Q>M, randomly select M scheduling resource indexes from $\{S_0, S_1 \ldots S_{Q-1}\}$ according to a scheduling resource index selection range pre-determined by the data sending end and the data receiving end.

The data receiving end further includes an index mapping unit, configured to, after it is determined that the feedback number of bits of HARQ information is K, map scheduling resource indexes corresponding to different detection results indicating an ACK or an NACK to an integer r, and send r, served as the determined HARQ information, to the data sending end;

herein r is: $(R+C_1) \bmod(2^{K-1})$;

herein $$R = 2^{M-1} * (u-1) + \left(\sum_{i=g(u)}^{Q-1} 2^{V_i}\right) + g(u) - 1 + \left\lceil \frac{Q}{M} \right\rceil;$$

$u = \min(s_0, N-M+2)$;

$$g(u) = \begin{cases} 1, & u \leq N-M+1 \\ 0, & u > N-M+1 \end{cases};$$

and $v_i = (s_i - u - g(u) + C_2) \bmod(M-1)$, and $C_1$ and $C_2$ are integer constants.

The method in the embodiment of the present disclosure will be clearly described in detail hereinbelow by means of specific application examples. The application examples are only used for stating the embodiment of the present disclosure, and not intended to limit the scope of protection of the method in the present disclosure.

Application Example One

Figure 3:
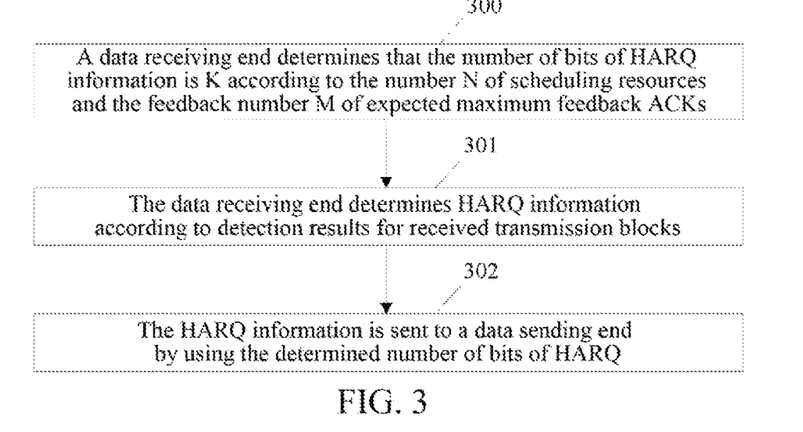
FIG. 3 is a flowchart of a method in application example one of the present disclosure.

FIG. 3 is a flowchart of a method in a first application example of the present disclosure. As shown in FIG. 3, the method includes the steps 300-303 as follows.

In step 300, a data receiving end determines that a feedback number of bits of HARQ information is K according to the number N of scheduling resources and the feedback number M of expected maximum feedback ACKs.

The number of scheduling resources and the feedback number are pre-determined by the data receiving end and the data sending end. For example, the data receiving end determines the number of scheduling resources and the feedback number through receiving resource configuration information sent by the data sending end, and the resource configuration information includes: carriers possibly sent by transport blocks, a transmission mode of each carrier, HARQ feedback modes of the carriers, the feedback number of expected maximum feedback ACKs, uplink and downlink configuration information of TDD, and the like (if the above-mentioned carriers are TDD carriers).

A transport block sent by a scheduling resource corresponds to 1-bit HARQ information, and if the transport block on the scheduling resource is correctly detected, an ACK will be fed back, and otherwise, an NACK will be fed back.

Pre-determination of the data receiving end and the data sending end includes two conditions. First, a carrier or a sub-frame or a mixture thereof may correspond to one or more scheduling resources. Second, multiple carriers or multiple sub-frames or a mixture thereof may correspond to one or more scheduling resources. For example, according to resource configuration information, carriers, possibly sending transport blocks, of the data sending end include four FDD carriers: a carrier 0, a carrier 1, a carrier 2 and a carrier 3. A transmission mode of the carrier 0 is non-spatial multiplexing, and transmission modes of the carriers 1, 2 and 3 are spatial multiplexing. Suppose that at most two data streams are multiplexed under spatial multiplexing, HARQ feedback modes of the above four carriers are a one-to-one mode (a transport block corresponds to 1-bit HARQ information, and if the transport block is correctly detected, an ACK will be fed back, and otherwise, an NACK will be fed back).

The data receiving end determines the number N of scheduling resources according to the resource configuration information pre-determined with the data sending end. When a carrier is a TDD carrier, the resource configuration information includes carriers possibly used for sending data, a transmission mode of each carrier, and HARQ feedback modes of the carriers. Herein the HARQ feedback modes mainly include: a one-to-one mode where one transport block corresponds to one HARQ bit, and a many-to-one mode where many transport blocks correspond to one HARQ bit. If the carrier is the TDD carrier, the resource configuration information further includes uplink and downlink configuration information of TDD. For example, carriers possibly used for sending data include four FDD carriers: a carrier 0, a carrier 1, a carrier 2 and a carrier 3. A transmission mode of the carrier 0 is non-spatial multiplexing, and transmission modes of the carriers 1, 2 and 3 are spatial multiplexing. Suppose that at most two data streams are multiplexed under spatial multiplexing, HARQ feedback modes of the above four carriers are the one-to-one mode.

Number N of scheduling resources=number of scheduling resources of carrier 0+number of scheduling resources of carrier 1+number of scheduling resources of carrier 2+number of scheduling resources of carrier 3=1+2+2+2=7.

If the carrier 3 is a TDD carrier, and an uplink and downlink configuration of the carrier 3 is a configuration 5 and others remain unchanged, then number N of scheduling resources=number of scheduling resources of carrier 0+number of scheduling resources of carrier 1+number of scheduling resources of carrier 2+number of scheduling resources of carrier 3=1+2+2+18=23.

If the carrier 3 is a TDD carrier, an uplink and downlink configuration is a configuration 5, and an HARQ feedback mode is a many-to-one mode, and two transport blocks correspond to one HARQ bit and others remain unchanged, then number N of scheduling resources=number of scheduling resources of carrier 0+number of scheduling resources of carrier 1+number of scheduling resources of carrier 2+number of scheduling resources of carrier 3=1+2+2+9=14.

According to resource configuration information, carriers possibly used for sending transport blocks, of the data sending end include four FDD carriers: a carrier 0, a carrier 1, a carrier 2 and a carrier 3. A transmission mode of the carrier 0 is non-spatial multiplexing, and transmission modes of the carriers 1, 2 and 3 are spatial multiplexing. Suppose that at most two data streams are multiplexed under spatial multiplexing, HARQ feedback modes of the above four carriers are the one-to-one mode (a transport block corresponds to 1-bit HARQ information, and if the transport block is correctly detected, an ACK will be fed back, and otherwise, an NACK will be fed back). Therefore, number N of scheduling resources=number of scheduling resources of carrier 0+number of scheduling resources of carrier 1+number of scheduling resources of carrier 2+number of scheduling resources of carrier 3=1+2+2+2=7.

In the example, for the carrier 0, one carrier corresponds to one scheduling resource, and for the carriers 2, 3 and 4, each carrier corresponds to two scheduling resources.

If the carrier 3 is a TDD carrier, and an uplink and downlink configuration is a configuration 5 and others remain unchanged, then number N of scheduling resources=number of scheduling resources of carrier 0+number of scheduling resources of carrier 1+number of scheduling resources of carrier 2+number of scheduling resources of carrier 3=1+2+2+18=23.

In the present application example, for the carrier 3, the data receiving end needs to feed HARQ back to nine downlink sub-frames on an uplink sub-frame. Since the transmission mode is spatial multiplexing, one sub-frame corresponds to two scheduling resources.

If the carrier 3 is a TDD carrier, and an uplink and downlink configuration is a configuration 5 and a transmission mode is non-spatial multiplexing, one sub-frame of the carrier corresponds to one scheduling resource, and the carrier corresponds to nine scheduling resources totally.

If the carrier 3 is a TDD carrier, and an uplink and downlink configuration is a configuration 5, and an HARQ feedback mode is a many-to-one mode, and two transport blocks correspond to one HARQ bit and others remain unchanged, number N of scheduling resources=number of scheduling resources of carrier 0+number of scheduling resources of carrier 1+number of scheduling resources of carrier 2+number of scheduling resources of carrier 3=1+2+2+9=14. In this case, one sub-frame of the carrier 3 still corresponds to one scheduling resource, and the carrier corresponds to nine scheduling resources totally.

Suppose that carrier indexes of the carriers used for sending data are 0, 1, 2, . . . , (L−1); and the number of transport blocks of the $w^{th}$ (w=0, 1, 2, . . . , (L−1)) carrier is $P_w$, and every $X_w$ transport blocks correspond to one HARQ bit, then the number of scheduling resources is $$\sum_{w=0}^{L-1} \frac{P_w}{X_w}.$$

When the carrier is an FDD carrier, $P_w$ is equal to 1 or 2 usually. When the FDD carrier works in the spatial multiplexing mode, $P_w=2$; and otherwise, $P_w=1$ and $X_w$ is equal to 1 usually. When the carrier is a TDD carrier, $P_w$ is associated with uplink and downlink configuration information of TDD in addition to the above-mentioned information. For example, it is supposed that an uplink and downlink configuration of a certain carrier w is a configuration 2, and an uplink sub-frame needs to feed data of four downlink sub-frames back. When the carrier works in the spatial multiplexing mode, $P_w=8$; when one transport block corresponds to one HARQ bit, $X_w=1$; and when two transport blocks correspond to one HARQ bit, $X_w=2$. When the carrier works in the non-spatial multiplexing mode, $P_w=4$; and when one transport block corresponds to one HARQ bit, $X_w=1$; and when four transport blocks correspond to one HARQ bit, $X_w=4$.

Further, the feedback number M of expected maximum feedback ACKs is the maximum number of scheduling resources required to be fed back by the data receiving end under the agreement of the data sending end and the data receiving end.

Or, the feedback number M of expected maximum feedback ACKs is the maximum number of scheduling resources used for sending transport blocks by the data receiving end under the agreement of the data sending end and the data receiving end. M is a positive integer. In an exemplary embodiment, M is less than or equal to $$\left\lfloor \frac{N-1}{2} \right\rfloor.$$

In the present step, it is determined that the feedback number of bits of HARQ information is K that is a positive integer not less than $\lceil \log_2(\Sigma_{i=0}^{M} C_N^i) \rceil$. In an exemplary embodiment, $K=\lceil \log_2(\Sigma_{i=0}^{M} C_N^i) \rceil$.

In step 301, the data receiving end determines HARQ information according to detection results for received transport blocks.

The data receiving end detects received data, and it is supposed that the detection results are that the number of ACKs is Q.

Usually, when $0 \leq Q \leq M$, suppose that a scheduling resource index corresponding to the $i^{th}$ (i=0, 1, . . . , Q−1) ACK is $S_i$, and $S_i$ is a positive integer mutually different in a monotonic function; then resource index information corresponding to the ACK corresponds to a number r, and the number r is served as HARQ information to be fed back. Specifically, a determination mode of r is as follows.

When Q=0, r=C, herein C is an integer constant that may be represented by K bits. For example, C=0.

When Q≠0, r is $(\Sigma_{i=0}^{Q-1}(C_N^i + C_{N-S_i}^{Q-i})) \bmod(2^K-1)$, herein $\lfloor \ \rfloor$ represents round-down.

They may also be unified as:

$$r: \left(\sum_{i=0}^{Q-1}(C_N^i + C_{N-S_i}^{Q-i}) + \left\lfloor \frac{Q}{M} \right\rfloor + C\right) \bmod(2^K-1), \text{ or,}$$

$$\left(\sum_{i=0}^{Q-1}(C_N^i + C_{N-S_i}^{Q-i}) + \left\lfloor \frac{Q}{N} \right\rfloor + C\right) \bmod(2^K-1);$$

herein, N scheduling resource indexes are 1, 2, . . . , N.

Sometimes, to reduce the feedback overhead, a situation of Q>M may occur. For example, when the number of scheduling resources used for sending transport blocks by the data sending end is greater than M, the data receiving end detects a result that the number Q of ACKs is probably greater than M.

When Q>M, the data receiving end may randomly select M resource indexes from $\{S_0, S_1 \ldots S_{Q-1}\}$. Suppose that the M selected resource indexes are: $D_0, D_1 \ldots D_{M-1}$, and $D_i$ is a positive integer mutually different in a monotonic function. For example, $D_i < D_{i+1}$, and at the same time, the above-mentioned resource index information corresponds to a number r, and the number r is served as HARQ information to be fed back. Specifically, a determination mode of r is as follows.

r is $(\Sigma_{i=0}^{M-1}(C_N^i + C_{N-D_i}^{M-i}) + C) \mod(2^K - 1)$.

Further, when Q>M, M resource indexes that may be selected from $\{S_0, S_1 \ldots S_{Q-1}\}$ by the data receiving end are appointed by the data sending end and the data receiving end in advance. For example, they appoint that M minimum indexes or M maximum indexes are selected, etc.

When Q>M, r determined by using the above-mentioned method is the same as r determined according to some situations when Q<M. That may probably cause that the data sending end falsely takes some transport blocks that are detected to be correct as transport blocks that are detected to be wrong. However, considering a wireless channel environment, if the data sending end considers that the transport blocks are sent by using P (P is an integer greater than M) scheduling resources, the number of scheduling resources that are correctly detected by the data receiving end will not generally exceed M (e.g., the reasons that the channel environment is severe, the power is limited, the rate exceeds a Shannon limit, and the like). Since the probability of Q>M is usually very low, the overhead will still be remarkably reduced by using the above-mentioned mode.

In step 302, the HARQ information is sent to a data sending end by using the determined number of bits of HARQ.

K binary bits are used to represent the above-mentioned integer r (representing a number by a binary bit falls within the conventional art, which will not be elaborated herein), and then the above-mentioned information is sent to the data sending end. Before sending, common operations such as coding, modulation and interleaving on the above-mentioned information are probably included.

Note that:
during calculation, if X<Y, then $C_X^Y = 0$.

Application Example Two

Configuring more unlicensed carriers for a terminal by a network side is an important way capable of improving the user experience and lowering the cost. Suppose that a network has 32 unlicensed downlink carriers, according to the conventional art, a terminal usually needs to feed 32-bit HARQ information back. However, according to an LTE protocol, when the terminal does not have uplink data, the terminal mainly feeds HARQ information back to the network through a physical uplink control channel, but the physical uplink control channel can send at most 20-bit HARQ information at present, and the network can configure at most 20 carriers for the terminal according to a calculation manner that one carrier corresponds to one HARQ bit.

In the present application example, the network side configures 32 unlicensed carriers for the terminal, and a transmission mode of each carrier is non-spatial multiplexing, and an HARQ feedback mode is a one-to-one mode, and the feedback number M of expected maximum feedback ACKs is equal to 5.

The terminal may determine that the number N of scheduling resources is equal to 32 according to the configuration information, and determine that the feedback number of bits of HARQ information K is equal to 18 according to the number N of scheduling resources and the feedback number M of expected maximum feedback ACKs. Compared with the conventional art, the present disclosure has the advantages that the overhead can be saved by 32−18=14 bits, and since the final feedback bit number does not exceed 20 bits, the terminal may send HARQ information by reusing the physical uplink control channel in the conventional art. Thus, by using the method in the present application example, the network side not only can configure more resources for the terminal and improve the peak rate and user experience of a user, but also has the effect of simplifying the implementation complexity of the terminal and a system.

In terms of determination of the feedback HARQ information, the terminal detects received data. Suppose that detection results are that the number of ACKs is Q (0<Q<M), a scheduling resource index corresponding to the $i^{th}$ (i=0, 1, . . . , Q−1) ACK is $S_i$ (suppose that N scheduling resource indexes (equivalent to carrier indexes in the present application example) are 1, 2, . . . , N), and $S_i < S_{i+1}$. Resource index information corresponding to the above-mentioned ACK corresponds to a number r, and the number r is served as the HARQ information to be fed back. Specifically, the value of r is:

$$\left(\sum_{i=0}^{Q-1}(C_N^i + C_{N-S_i}^{Q-i}) + \left\lfloor \frac{Q}{M} \right\rfloor + C\right) \mod(2^K - 1);$$

herein C is an integer constant.

The terminal represents the above-mentioned integer r by using 18 binary bits (representing a number by a binary bit falls within the conventional art, which will not be elaborated herein), and then sends the above-mentioned information to the network. Before sending, common operations such as coding, modulation and interleaving of a wireless communication system on the above-mentioned information are probably included.

Application Example Three

A network side configures a TDD carrier for a terminal, and an uplink and downlink configuration of the carrier is a configuration 5, and a transmission mode of the carrier is a non-spatial multiplexing mode. Within a radio frame, a maximum sub-frame number of a scheduling target terminal is 2.

On the basis of the above-mentioned configuration information, the terminal may determine that the number N of scheduling numbers is equal to 9. Without loss of generality, suppose that scheduling resource indexes are 1, 2, . . . , 9 (here, the scheduling resource indexes correspond to nine downlink sub-frame indexes of the configuration 5). An expected maximum feedback resource number M is equal to 2. The terminal determines the bit number K of HARQ information according to the following formula:

$\lceil \log_2(\Sigma_{i=0}^M C_N^i) \rceil = 6$.

Furthermore, the terminal determines feedback information according to detection results that the number of ACKs is Q (0≤Q≤M). Details are as follows.

Suppose that a resource index corresponding to the $i^{th}$ (i=0, 1, ..., Q−1) ACK is $S_i$, and $S_i$ is a positive integer mutually different in a monotonic function, for example, $S_i < S_{i+1}$. When the number of ACKs is Q, the terminal represents HARQ information required to be fed back by using a number r, and r is determined as:

$$\left( \sum_{i=0}^{Q-1} (C_N^i + C_{N-S_i}^{Q-i}) + \left\lfloor \frac{Q}{M} \right\rfloor + C \right) \mod(2^K - 1);$$

herein C is an integer constant.

Suppose that C=0, and apparently, when Q=0, r=0. Table 1 is a mapping table of mapping a resource index corresponding to an ACK to r when Q=1. When Q=1, resource indexes corresponding to the ACK are different values, and corresponding values of r are as shown in the following table:

TABLE 1

| $s_0$ | 1 | 2 | 3 | 4 | 5 | 6 | 7 | 8 | 9 |
|---|---|---|---|---|---|---|---|---|---|
| R | 9 | 8 | 7 | 6 | 5 | 4 | 3 | 2 | 1 |

Table 2 is a mapping table of mapping a resource index corresponding to an ACK to r when Q=2. When Q=2, resource indexes corresponding to the ACK are different values, and corresponding values of r are as shown in the following table:

TABLE 2

| $s_0, s_1$ | 1.2 | 1.3 | 1.4 | 1.5 | 1.6 | 1.7 | 1.8 | 1.9 | 2.3 |
|---|---|---|---|---|---|---|---|---|---|
| R | 45 | 44 | 43 | 42 | 41 | 40 | 39 | 38 | 37 |
| $s_0, s_1$ | 2.4 | 2.5 | 2.6 | 2.7 | 2.8 | 2.9 | 3.4 | 3.5 | 3.6 |
| R | 36 | 35 | 34 | 33 | 32 | 31 | 30 | 29 | 28 |
| $s_0, s_1$ | 3.7 | 3.8 | 3.9 | 4.5 | 4.6 | 4.7 | 4.8 | 4.9 | 5.6 |
| R | 27 | 26 | 25 | 24 | 23 | 22 | 21 | 20 | 19 |
| $s_0, s_1$ | 5.7 | 5.8 | 5.9 | 6.7 | 6.8 | 6.9 | 7.8 | 7.9 | 8.9 |
| R | 18 | 17 | 16 | 15 | 14 | 13 | 12 | 11 | 10 |

K binary bits are used to represent the above-mentioned integer r, and then the above-mentioned information is sent to the network side. Before sending, common operations such as coding, modulation and interleaving of a wireless communication system on the above-mentioned information are probably included.

At the network side, the network recovers the number r according to the above-mentioned received information, and determines HARQ information fed back by the terminal according to the above tables. For example, if r recovered by the network is equal to 17, the network may determine that transport blocks sent on scheduling resource blocks 5 and 8 are correctly received.

Application Example Four

In the present application example, a network side configures 32 unlicensed carriers for a terminal, and a transmission mode of each carrier is non-spatial multiplexing, and an HARQ feedback mode is a one-to-one mode. Also M is equal to a maximum number of scheduling resources used for sending transport blocks by a data sending end and pre-determined by the data sending end and a data receiving end, and M is not less than 2, and the above-mentioned M scheduling resources are successive, and in the present application example, M=10. The terminal may determine that the number N of scheduling resources is equal to 32 according to the configuration information, and determine the feedback number of bits of HARQ information K according to N and M, and K=⌈log₂(N−M+2)⌉M−1=10. Compared with the conventional art, the present application example has the advantages that the overhead can be saved by 32−10=22 bits, and since the final feedback bit number does not exceed 20 bits, the terminal may send HARQ information by reusing a physical uplink control channel in the conventional art. Thus, by using the method in the present application example, the network side not only can configure more resources for the terminal and improve the peak rate and user experience of a user, but also has the effect of simplifying the implementation complexity of the terminal and a system.

In terms of determination of the HARQ information to be fed back, the terminal detects received data. Suppose that detection results are that the number of ACKs is Q (QM), a scheduling resource index corresponding to the $i^{th}$ (i=0, 1, ..., Q−1) ACK is $S_i$ (supposed N scheduling resource indexes (equivalent to carrier indexes in the present application example) are 1, 2, ..., N), and $S_i$ is a positive integer mutually different in a monotonic function, for example, $S_i > S_{i+1}$. Resource index information corresponding to the above-mentioned ACK corresponds to a number r, and binary bits corresponding to the number r are served as the HARQ information to be fed back. Specifically, r is determined as:

$(R+C_1)\mod(2^{K-1})$;

herein $$R = 2^{M-1} * (u-1) + \left( \sum_{i=g(u)}^{Q-1} 2^{v_i} \right) + g(u) - 1 + \left\lceil \frac{Q}{M} \right\rceil;$$

$u = \min(s_0, N-M+2)$;

$$g(u) = \begin{cases} 1, u \leq N - M + 1 \\ 0, u > N - M + 1 \end{cases};$$

and $v_i = (s_i - u - g(u) + C_2) \mod(M-1)$.

Those ordinary skilled in the art may understand that all or some of the steps in the above-mentioned method may be completed by instructing relevant hardware (e.g., processor) through a program. The program may be stored in a computer-readable storage medium such as a read-only memory, a magnetic disk or an optical disk or the like. In an exemplary embodiment, all or some of the steps in the above-mentioned embodiments may be implemented by using one or more integrated circuits. Accordingly, each module/unit in the above-mentioned embodiments may be implemented in a form of hardware, and for example, corresponding functions thereof are implemented by means of an integrated circuit. Each module/unit may also be implemented in a form of software function module, and for example, corresponding functions thereof are implemented by executing programs/instructions stored in a memory by the processor. The present disclosure is not limited to the combination of hardware and software in any specific form.

Although the implementation mode disclosed in the present application is as above, the content is only the implementation modes adopted for convenience of understanding the present application, not intended to limit the present application, such as specific implementation methods in the implementation mode of the present disclosure. Any person skilled in the art may make any modifications and changes about an implementation form and details without departing from the essence and scope disclosed in the present application. However, the scope of patent protection of the present application must be subject to the scope defined by the appended claims.

INDUSTRIAL APPLICABILITY

In the above-mentioned technical solution, the data sending end determines HARQ information is a content sent for which HARQ information.

I claim:

1. A method for sending of Hybrid Automatic Repeat reQuest (HARQ) information, comprising:
sending, by a data receiving end, HARQ information to a data sending end according to a number of scheduling resources and a feedback number of expected maximum feedback Acknowledgements (ACKs), wherein the HARQ information is determined through detection results for received transport blocks; wherein the feedback number is M, and the number of scheduling resources is N; the N is a positive integer greater than or equal to 3, and the M is a positive integer less than the N; and the number of bits of HARQ is K;
wherein the detection results are that a number of ACKs is Q and a scheduling resource index corresponding to an $i^{th}$ ACK or NACK is $S_i$, and the method further comprises:
mapping each of scheduling resource indexes corresponding to different detection results indicating ACKs or NACKs to an integer r, and sending the integer r, served as the determined HARQ information, to the data sending end;
wherein when $$0 \leq Q \leq M, r \text{ is: } \left(\sum_{i=0}^{Q-1}(C_N^i + C_{N-S_i}^{Q-i}) + \left\lfloor \frac{Q}{M} \right\rfloor + C\right) \bmod(2^K - 1) \text{ or}$$

$$\left(\sum_{i=0}^{Q-1}(C_N^i + C_{N-S_i}^{Q-i}) + \left\lfloor \frac{Q}{N} \right\rfloor + C\right) \bmod(2^K - 1),$$

N scheduling resource indexes are 1, 2, . . . , N, and $S_i$ is a positive integer mutually different in a monotonic function, and i∈[0, 1, K Q−1], and C is an integer constant.

2. The method according to claim 1, wherein the sending HARQ information to a data sending end according to a number of scheduling resources and a feedback number of expected maximum feedback ACKs, wherein the HARQ information is determined through detection results for received transport blocks comprises:
determining, by the data receiving end, the number of bits of HARQ according to the number of scheduling resources and the feedback number of expected maximum feedback ACKs; and
determining, by the data receiving end, HARQ information according to the detection results for the received transport blocks, and sending the HARQ information to the data sending end by using the determined number of bits of HARQ.

3. The method according to claim 2, wherein the M is a value pre-determined by the data receiving end and the data sending end.

4. The method according to claim 3, further comprising: when Q≤M and M is greater than or equal to 2,
determining, by the data receiving end, that the number of bits of HARQ information to be fed back is K according to N and M, wherein K≥⌈log$_2$(N−M+2)⌉+M−1.

5. The method according to claim 4, further comprising: after determining that the number of bits of HARQ information to be fed back is K,
mapping each of scheduling resource indexes corresponding to different detection results indicating ACKs or an NACKs to an integer r, and sending the integer r, served as the determined HARQ information, to the data sending end;
wherein r is: $(R+C_1)\bmod(2^{K-1})$;
wherein $$R = 2^{M-1} * (u-1) + \left(\sum_{i=g(u)}^{Q-1} 2^{V_i}\right) + g(u) - 1 + \left\lceil \frac{Q}{M} \right\rceil,$$

u=min($s_0$, N−M+2);

$$g(u) = \begin{cases} 1, u \leq N - M + 1 \\ 0, u > N - M + 1 \end{cases};$$

and
$v_i=(s_i-u-g(u)+C_2)\bmod(M-1)$; and
$C_1$ and $C_2$ are integer constants.

6. The method according to claim 5, further comprising:
representing the integer r by using K binary bits respectively, and sending the integer r to the data sending end; and
further comprising: before the r is sent to the data sending end,
coding and/or modulating and/or interleaving the r.

7. The method according to claim 2, wherein the M is:
a maximum value greater than or equal to the number of scheduling resources used for receiving the transport blocks by the data receiving end, or,
a maximum value greater than or equal to the number of scheduling resources used for sending the transport blocks by the data sending end.

8. The method according to claim 1, wherein $$M < \left\lfloor \frac{N-1}{2} \right\rfloor,$$

wherein ⌊ ⌋ represents round-down.

9. The method according to claim 1, wherein ⌈log$^2$ ($\Sigma_{i=0}^{M}C_N^i$)⌉, wherein ⌈ ⌉ represents round-up.

10. The method according to claim 9, further comprising:
when Q>M, randomly selecting, by the data receiving end, M scheduling resource indexes from {$S_0$, $S_1$ . . . $S_{Q-1}$}, wherein the M randomly-selected scheduling resource indexes are: $D_0$, $D_1$ . . . $D_{M-1}$, and $D_i$ is a positive integer mutually different in a monotonic function, and mapping each of the M scheduling resource indexes to an integer r, and sending the integer r, served as the determined HARQ information, to the data sending end, wherein r is:

$$\left(\sum_{i=0}^{M-1}(C_N^i + C_{N-D_i}^{M-i}) + C\right) \bmod(2^K - 1);$$

wherein the randomly selecting, by the data receiving end, M scheduling resource indexes from $\{S_0, S_1 \ldots S_{Q-1}\}$ comprises:
selecting, by the data receiving end, M scheduling resource indexes from $\{S_0, S_1 \ldots S_{Q-1}\}$ according to a scheduling resource index selection range pre-determined by the data sending end and the data receiving end; or
selecting, by the data receiving end, M minimum or maximum scheduling resource indexes from $\{S_0, S_1 \ldots S_{Q-1}\}$ according to a scheduling resource index selection range pre-determined by the data sending end and the data receiving end.

11. The method according to claim 10, further comprising:
representing the integer r by using K binary bits respectively, and sending the integer r to the data sending end; and
further comprising: before the r is sent to the data sending end,
coding and/or modulating and/or interleaving the r.

12. The method according to claim 1, wherein the feedback number of expected maximum feedback ACKs is sent to the data receiving end in a signaling mode.

13. The method according to claim 1, further comprising: determining, by the data receiving end, the number of scheduling resources and/or the feedback number of expected maximum feedback ACKs according to resource configuration information.

14. The method according to claim 1, wherein the determining, by the data receiving end, HARQ information according to the detection results for the received transport blocks comprises:
detecting, by the data receiving end, the received transport blocks, and taking scheduling resource index information corresponding to detection results indicating ACKs or NACKs as the determined HARQ information.

15. A data receiving end for sending of Hybrid Automatic Repeat reQuest (HARQ) information, comprising:
a processor; and
a non-transitory computer readable storage medium storing instructions that, when executed by the processor, cause the processor to perform steps comprising:
determining a number of bits of HARQ according to a number of scheduling resources and a feedback number of expected maximum feedback Acknowledgements (ACKs); and
determining HARQ information according to detection results for received transport blocks, and sending the HARQ information to a data sending end by using the determined number of bits of HARQ;
wherein the feedback number is M, and the number of scheduling resources is N; the N is a positive integer greater than or equal to 3, and the M is a positive integer less than the N; and the number of bits of HARQ is K;

wherein the detection results are that a number of ACKs is Q and a scheduling resource index corresponding to an ith ACK or NACK is $S_i$, and the steps further comprise:
mapping each of scheduling resource indexes corresponding to different detection results indicating ACKs or NACKs to an integer r, and sending the integer r, served as the determined HARQ information, to the data sending end;
wherein when $$0 \le Q \le M, r \text{ is: } \left(\sum_{i=0}^{Q-1}(C_N^i + C_{N-S_i}^{Q-i}) + \left\lfloor \frac{Q}{M} \right\rfloor + C\right) \bmod(2^K - 1), \text{ or}$$

$$\left(\sum_{i=0}^{Q-1}(C_N^i + C_{N-S_i}^{Q-i}) + \left\lfloor \frac{Q}{N} \right\rfloor + C\right) \bmod(2^K - 1);$$

N scheduling resource indexes are 1, 2, ..., N, $S_i$ is a positive integer mutually different in a monotonic function, i∈[0, 1, K Q−1], and C is an integer constant.

16. The data receiving end according to claim 15, wherein the steps further comprise receiving the feedback number of expected maximum feedback ACKs sent in a signaling mode.

17. The data receiving end according to claim 15, wherein the steps further comprise:
detecting the received transport blocks, and taking scheduling resource index information corresponding to detection results indicating ACKs or NACKs as the determined HARQ information; and
sending the HARQ information to the data sending end by the determined number of bits of HARQ to be fed back.

18. The data receiving end according to claim 15, wherein the steps further comprise determining the number of scheduling resources and/or the feedback number of expected maximum feedback ACKs according to resource configuration information.

19. The data receiving end according to claim 15, wherein the steps further comprise:
when Q>M, randomly selecting M scheduling resource indexes from $\{S_0, S_1 \ldots S_{Q-1}\}$, wherein the M randomly-selected scheduling resource indexes are: $D_0, D_1 \ldots D_{M-1}$, and $D_i$ is a positive integer mutually different in a monotonic function, and mapping each of the M scheduling resource indexes to an integer r, and sending the integer r, served as the determined HARQ information, to the data sending end, wherein r is:

$$\left(\sum_{i=0}^{M-1}(C_N^i + C_{N-D_i}^{M-i}) + C\right) \bmod(2^K - 1);$$

wherein the randomly selecting M scheduling resource indexes from $\{S_0, S_1 \ldots S_{Q-1}\}$ comprises:
selecting M scheduling resource indexes from $\{S_0, S_1 \ldots S_{Q-1}\}$ according to a scheduling resource index selection range pre-determined by the data sending end and the data receiving end; or
selecting M minimum or maximum scheduling resource indexes from $\{S_0, S_1 \ldots S_{Q-1}\}$ according to a scheduling resource index selection range pre-determined by the data sending end and the data receiving end.

20. A non-transitory computer storage medium in which a computer-executable instruction is stored, wherein the computer-executable instruction is used for executing the method according to claim 1.

* * * * *